(12) United States Patent
Said-Diatta

(10) Patent No.: US 11,370,866 B2
(45) Date of Patent: Jun. 28, 2022

(54) METHOD FOR PRODUCING A DIENE ELASTOMER MODIFIED WITH A 1,3-DIPOLAR COMPOUND

(71) Applicant: COMPAGNIE GENERALE DES ETABLISSEMENTS MICHELIN, Clermont-Ferrand (FR)

(72) Inventor: Rokhiyatou Said-Diatta, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 295 days.

(21) Appl. No.: 16/470,955

(22) PCT Filed: Dec. 19, 2017

(86) PCT No.: PCT/FR2017/053678
§ 371 (c)(1),
(2) Date: Jun. 18, 2019

(87) PCT Pub. No.: WO2018/115704
PCT Pub. Date: Jun. 28, 2018

(65) Prior Publication Data
US 2019/0315888 A1    Oct. 17, 2019

(30) Foreign Application Priority Data
Dec. 19, 2016 (FR) .................................. 1662764

(51) Int. Cl.
| | | |
|---|---|---|
| *C08F 279/02* | (2006.01) | |
| *B01J 2/20* | (2006.01) | |
| *C08K 3/04* | (2006.01) | |
| *C08K 3/36* | (2006.01) | |
| *C08L 15/00* | (2006.01) | |
| *C08C 19/22* | (2006.01) | |
| *C08J 3/20* | (2006.01) | |

(52) U.S. Cl.
CPC ............... *C08F 279/02* (2013.01); *B01J 2/20* (2013.01); *C08C 19/22* (2013.01); *C08J 3/203* (2013.01); *C08K 3/04* (2013.01); *C08K 3/36* (2013.01); *C08L 15/00* (2013.01); *C08L 2201/08* (2013.01)

(58) Field of Classification Search
CPC .. C08C 19/22; B01J 2/20; C08J 3/203; C08K 3/04; C08K 3/36; C08L 15/00; C08L 2201/08; C08F 279/02
USPC ......................................................... 524/572
See application file for complete search history.

(56) References Cited

U.S. PATENT DOCUMENTS

| | | | |
|---|---|---|---|
| 5,244,954 A | 9/1993 | Fasulo et al. | |
| 8,669,339 B2 | 3/2014 | Okabe et al. | |
| 2013/0123418 A1* | 5/2013 | Araujo Da silva | C08K 5/3445 524/575 |
| 2015/0322183 A1* | 11/2015 | Vallat | C08L 15/00 524/572 |
| 2016/0264753 A1* | 9/2016 | Salit | C08L 15/00 |

FOREIGN PATENT DOCUMENTS

| | | |
|---|---|---|
| CN | 1986635 A | 6/2007 |
| EP | 0492550 A1 | 7/1992 |
| JP | 2004137396 A | 5/2004 |

OTHER PUBLICATIONS

International Search Report with Translation and Written Opinion corresponding to PCT/FR2017/053678 field Mar. 9, 2018.

* cited by examiner

*Primary Examiner* — Kelechi C Egwim
(74) *Attorney, Agent, or Firm* — Dickinson Wright PLLC

(57) ABSTRACT

A process for the preparation of a diene elastomer modified by a 1,3-dipolar compound is provided. The process comprises a thermomechanical kneading of a mixture of a diene elastomer and of a 1,3-dipolar compound in an internal mixer in order to form a modified diene elastomer, followed by an extrusion of the modified diene elastomer.

20 Claims, No Drawings

METHOD FOR PRODUCING A DIENE ELASTOMER MODIFIED WITH A 1,3-DIPOLAR COMPOUND

This application is a 371 national phase entry of PCT/FR2017/053678 filed on 19 Dec. 2017, which claims benefit of French Patent Application No. 1662764, filed 19 Dec. 2016, the entire contents of which are incorporated herein by reference for all purposes.

BACKGROUND

1. Technical Field

The present invention relates to a process for the preparation of a diene elastomer modified by a reaction of grafting a 1,3-dipolar compound.

2. Related Art

The modification of diene elastomer with a 1,3-dipolar compound is known. The modification takes place by a [3+2]-cycloaddition reaction of the 1,3-dipolar compound with the double bonds of the diene units of the elastomer. Very often, the 1,3-dipolar compound used is a compound which, besides the dipole, bears a chemical functional group which makes it possible to graft pendent chemical functional groups to the elastomer. Such modified elastomers can be intended for use in tire rubber compositions. These modification reactions can be carried out in solution or in bulk, for example in an internal mixer, such as is described, for example, in the documents WO 2012007442, WO 2015059271 and WO 2015177105. When the modified elastomer is intended to be used in a rubber composition comprising a reinforcing filler and when several tens or hundreds of kilograms of diene elastomer are modified in an internal mixer by thermomechanical kneading of the diene elastomer and of the 1,3-dipolar compound, the modification reaction is followed by the addition and by the incorporation of the reinforcing filler and optionally of the other ingredients of the composition. The combination is mixed by thermomechanical kneading in the internal mixer and then the filler-comprising mixture is dropped in order to recover it. In the dropping, it is found that the filler-comprising mixture falls as a powder, which makes it very difficult to use the filler-comprising mixture for the subsequent stages of preparation of the rubber composition. It is also found that the grafting yield is fluctuating and may reach relatively low values.

SUMMARY

The Applicant Companies, continuing their efforts, have found a novel bulk modification process which makes it possible to solve the abovementioned problems.

A subject-matter of the invention is thus a process for the preparation of a diene elastomer modified by a 1,3-dipolar compound, characterized in that it comprises the following stages:
  a. a diene elastomer and a 1,3-dipolar compound are mixed by thermomechanical kneading in an internal mixer in order to form a diene elastomer modified by a reaction of grafting the 1,3-dipolar compound to the diene elastomer,
  b. the modified diene elastomer is extruded.

Another subject-matter of the invention is a process for the preparation of a rubber composition based on a diene elastomer modified by a 1,3-dipolar compound and on a reinforcing filler which comprises the following stages:
  i. a diene elastomer and a 1,3-dipolar compound are mixed by thermomechanical kneading in an internal mixer in order to form a diene elastomer modified by a reaction of grafting the 1,3-dipolar compound to the diene elastomer,
  ii. the modified diene elastomer is extruded,
  iii. a reinforcing filler is incorporated in the modified diene elastomer resulting from stage ii) by thermomechanical kneading in an internal mixer.

Another subject-matter of the invention is a granule of diene elastomer modified by a reaction of grafting a 1,3-dipolar compound capable of being obtained by the process in accordance with the invention in which stage b) is followed by a stage of granulation of the modified diene elastomer.

Another subject-matter of the invention is the use of granules in accordance with the invention in a rubber composition comprising a reinforcing filler.

I. DETAILED DESCRIPTION OF EXAMPLE EMBODIMENTS

In the present description, unless expressly indicated otherwise, all the percentages (%) shown are % by weight. The abbreviation "phr" means parts by weight per hundred parts of elastomer (of the total of the elastomers, if several elastomers are present).

Any interval of values denoted by the expression "between a and b" represents the range of values extending from more than a to less than b (that is to say, limits a and b excluded), whereas any range of values denoted by the expression "from a to b" means the range of values extending from a up to b (that is to say, including the strict limits a and b).

The expression "composition based on" should be understood as meaning, in the present description, a composition comprising the mixture and/or the in situ reaction product of the various constituents used, some of these base constituents (for example the elastomer, the filler or other additive conventionally used in a rubber composition intended for the manufacture of tires) being capable of reacting or intended to react with one another, at least in part, during the various phases of manufacture of the composition intended for the manufacture of tires.

The compounds mentioned in the description can be of fossil or biobased origin. In the latter case, they may partially or completely result from biomass or be obtained from renewable starting materials resulting from biomass. Polymers and 1,3-dipolar compounds are concerned in particular.

A "diene" elastomer (or without distinction rubber) should be understood, in a known way, as meaning an elastomer (or several elastomers) composed, at least in part (i.e., a homopolymer or a copolymer), of diene monomer units (monomers bearing two conjugated or non-conjugated carbon-carbon double bonds).

Given these definitions, diene elastomer capable of being used in the compositions in accordance with the invention is understood more particularly to mean:
(a)—any homopolymer of a conjugated diene monomer, in particular any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;
(c)—any ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(e)—any copolymer obtained by copolymerization of one or more conjugated dienes with ethylene, an acyclic aliphatic α-monoolefin having from 3 to 18 carbon atoms or their mixture, such as, for example, those described in the documents WO 2005/028526, WO 2004/035639 and WO 2007/054224.

Preferably, the diene elastomer is selected from the group consisting of polybutadienes, polyisoprenes, butadiene copolymers, isoprene copolymers and their mixtures. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs) and copolymers of ethylene and of butadiene. More preferably, the diene elastomer is a polyisoprene comprising more than 90 mol % of cis-1,4-bonding. Synthetic polyisoprenes having such a microstructure may very particularly be suitable.

The diene elastomer preferably contains an antioxidant. The antioxidant can be any antioxidant, in particular any antioxidant conventionally used to protect diene elastomers. The antioxidant is generally introduced into the elastomer in the process of synthesis of the elastomer, generally during or after the reaction for termination of the elastomer chains. Of course, the antioxidant can be a mixture of several antioxidants. Mention may be made, for example, of the antioxidants belonging to the family of the phenols, of the amines, of the quinones, of the tocopherols, of the tocotrienols or of the thiols. By way of example, para-phenylenediamine derivatives, also denoted in a known way as substituted para-phenylenediamines, such as, for example, N-(1,3-dimethylbutyl)-N'-phenyl-p-phenylenediamine (better known under the abbreviation "6-PPD"), N-isopropyl-N'-phenyl-p-phenylenediamine (abbreviated to "I-PPD"), phenyl-cyclohexyl-p-phenylenediamine, N,N'-di(1,4-dimethylpentyl)-p-phenylenediamine, N,N'-diaryl-p-phenylenediamine ("DTPD"), diaryl-p-phenylenediamine ("DAPD"), 2,4,6-tris-(N-1,4-dimethylpentyl-p-phenylenediamino)-1,3,5-triazine and the mixtures of such diamines, quinoline derivatives ("TMQ"), such as, for example, 1,2-dihydro-2,2,4-trimethylquinoline and 6-ethoxy-1,2-dihydro-2,2,4-trimethylquinoline, phenol derivatives, in particular cresol derivatives, such as 2,2'-methylenebis(6-(tert-butyl)-4-methylphenol), known under the name of "AO2246", or copolymers of dicyclopentadiene and of para-cresol, in particular the antioxidant "Struktol LA229" from Schill & Seilacher, or substituted diphenylamine or triphenylamine derivatives, such as described, for example, in Applications WO 2007/121936, WO 2008/055683 and WO2009/138460, in particular 4,4'-bis(isopropylamino)triphenylamine, 4,4'-bis(1,3-dimethylbutylamino)triphenylamine, 4,4'-bis(1,4-dimethylpentylamino)triphenylamine, 4,4',4''-tris(1,3-dimethylbutylamino)triphenylamine or 4,4',4''-tris(1,4-dimethylpentylamino)triphenylamine, are suitable.

The presence of antioxidant in the diene elastomer makes it possible to minimize, indeed even to limit, the changes in macrostructure of the diene elastomer which might result from the passage of the diene elastomer through the extruder. In order to limit the cost related to the use of the antioxidant, it is preferable to use as little antioxidant as possible. Typically, the content of antioxidant is between 1 and 20 phr.

The diene elastomer can be an extended elastomer. The term "extended elastomer" is understood to mean an elastomer to which a plasticizer has been added, in particular conventionally, for example, in the process for finishing the diene elastomer. Mention may be made, by way of plasticizer, of the extender oils conventionally used in tire rubber compositions, such as naphthenic oils, paraffinic oils, DAE oils, MES (Medium Extracted Solvates) oils, TDAE (Treated Distillate Aromatic Extracts) oils, RAE (Residual Aromatic Extracts) oils, TRAE (Treated Residual Aromatic Extracts) oils and SRAE (Safety Residual Aromatic Extracts) oils, mineral oils.

The term "1,3-dipolar compound" is understood according to the definition given by the IUPAC. The dipole of the 1,3-dipolar compound can be a nitrile oxide, a nitrone or a nitrilimine and is preferably a nitrile oxide.

When the dipole of the 1,3-dipolar compound is a nitrile oxide, the 1,3-dipolar compound preferably comprises a benzene ring which is substituted by the dipole. More preferably, the benzene ring is also substituted in the position ortho to the dipole. These preferred embodiments make it possible to optimize the grafting yield even more. This is because the presence of the benzene ring in the structure of the 1,3-dipolar compound, in particular substituted in the ortho position, confers a better stability on the 1,3-dipolar compound on storage before it is brought into contact with the diene elastomer.

The 1,3-dipolar compound, besides the dipole, can bear another chemical functional group. Mention may be made, as chemical functional group, of the groups which can be joined together by hydrogen bonds, such as those described in the document WO 2012007441, very particularly the groups containing a 5-membered dinitrogenous and carbonylated heterocycle, such as the 2-oxoimidazolidin-1-yl group, it being possible for the groups to interact with the surface of a reinforcing filler conventionally used in tire rubber compositions, such as imidazole, ester, oxazoline, thiazoline, alkoxysilane and allyltin groups, as respectively described in the documents WO 2015059271, WO2015177105 and WO 2006045088.

The amount of 1,3-dipolar compound introduced into the internal mixer, expressed in moles per 100 moles of elastomer units, can vary to a great extent, for example within a range of between 0.01 and 50, preferably from 0.01 to 3. It is indexed to the grafting yield and the degree of grafting desired on the diene elastomer, which depends on the application envisaged for the modified diene elastomer.

The process in accordance with the invention has the essential characteristic of comprising a stage a) during which a diene elastomer and a 1,3-dipolar compound are mixed by thermomechanical kneading in an internal mixer in order to form a diene elastomer modified by a reaction of grafting the 1,3-dipolar compound to the elastomer. As the kneading of the diene elastomer in the internal mixer is accompanied by a heating of the elastomer, the rise in the compounding temperature makes it possible for the 1,3-dipolar compound to react with the double bonds of the diene units of the elastomer by a [3+2]-cycloaddition reaction. Preferably, the diene elastomer and the 1,3-dipolar compound are kneaded in the internal mixer until a maximum compounding temperature ranging from 110 to 180° C., preferably of between 140 and 170° C., is reached. It is preferable to knead up to a compounding temperature which does not exceed 170° C. A compounding temperature exceeding 170° C. might result in a change in the macrostructure of the diene elastomer, even treated with antioxidant beforehand, which is not desirable for some applications in which it is desired to use the modified diene elastomer. Such kneading conditions make it possible to graft the 1,3-dipolar compound with a good yield and rapidly, for example in less than 3 minutes.

The term "compounding temperature" refers to the temperature of the diene elastomer, modified or unmodified, in the internal mixer. As the mixer is composed of a vessel in which the kneading takes place, the vessel typically has a temperature chosen within a range extending from 30 to 70° C. before introducing the diene elastomer and the 1,3-dipolar compound into the internal mixer.

The maximum compounding temperature being reached, the dropping is carried out conventionally in order to recover the modified diene elastomer from the internal mixer. Subsequently, stage b) is carried out, during which the diene elastomer is extruded, typically in order to shape it.

In order to carry out stage b), the modified diene elastomer is conventionally introduced into the feed zone of the extruder. The modified diene elastomer can be provided in any form in so far as it is suitable for feeding via a hopper which equips the extruder. For example, the modified diene elastomer can be calendered, in order to be provided in the form of a strip, or shredded into small pieces, in order to feed the extruder. The extruder can be a single-screw extruder, that is to say comprising one endless screw, or be a twin-screw extruder, that is to say comprising a set of two endless screws. It conventionally comprises a barrel. As extrusion is a shaping operation, the set temperature of the extruder preferably does not exceed 40° C. The term "set temperature of the extruder" is understood to mean the set temperature applied to the interior of the extruder, in particular to the barrel. At the outlet of the extruder, after passing through the die, the modified diene elastomer is preferably cut up into granules according to a granulation stage well known to a person skilled in the art. Any device known for cutting up diene elastomers in processes for the manufacture of synthetic rubbers can be used, such as a hammer or a granulator. It is positioned after the die. In order to be able to conserve the granules without them agglomerating, it is possible to put talc on the granules and then, if need be, to place them in a suitable packaging in order to be able to transport them, store them or handle them.

The granules capable of being obtained according to the process in accordance with the invention can be used as elastomer in a rubber composition comprising a reinforcing filler.

The reinforcing filler can be any type of "reinforcing" filler known for its abilities to reinforce a rubber composition which can be used for the manufacture of tires, for example an organic filler, such as carbon black, a reinforcing inorganic filler, such as silica, with which is combined, in a known way, a coupling agent, or else a mixture of these two types of filler. Such a reinforcing filler typically consists of nanoparticles, the (weight-) average size of which is less than a micrometre, generally less than 500 nm, most often between 20 and 200 nm, in particular and more preferably between 20 and 150 nm.

The process for the preparation of the rubber composition has the essential characteristic of comprising the stages a) and b) which are defined according to any one of the embodiments for the preparation of the modified diene elastomer. It additionally comprises a stage of incorporation of the reinforcing filler in the modified and extruded diene elastomer, preferably in the form of granules, in an internal mixer. It thus comprises the following stages:

i. a diene elastomer and a 1,3-dipolar compound are mixed by thermomechanical kneading in an internal mixer in order to form a diene elastomer modified by a reaction of grafting the 1,3-dipolar compound to the diene elastomer,
ii. the modified diene elastomer is extruded,
iii. a reinforcing filler is incorporated in the modified diene elastomer resulting from stage ii) by thermomechanical kneading in an internal mixer.

A stage of granulation of the modified diene elastomer can follow stage ii) and precede stage iii) in the process for the preparation of the rubber composition.

The stage of incorporation of the reinforcing filler in the modified and extruded diene elastomer can be carried out in a way known to a person skilled in the art and conventionally by carrying out a high-temperature thermomechanical kneading ("non-productive" phase) up to a maximum temperature of between 110° C. and 200° C., preferably between 130° C. and 185° C. During this "non-productive" phase, all the constituents necessary for the rubber composition, with the exception of the crosslinking system, can also be introduced into the internal mixer. The total duration of the kneading, in this non-productive phase, is preferably between 2 and 10 min. After cooling the mixture thus obtained during the first non-productive phase, the crosslinking system is then incorporated at low temperature, generally in an external mixer, such as an open mill; everything is then mixed (productive phase) for a few minutes, for example between 5 and 15 min.

The final composition thus obtained is subsequently calendered, for example in the form of a sheet or of a plaque, in particular for a laboratory characterization, or else extruded in the form of a rubber profiled element which can be used, for example, as a tire semi-finished article, such as a tire tread.

The abovementioned characteristics of the present invention, and also others, will be understood more clearly on reading the following description of the implementational examples of the invention, given by way of illustration and without limitation.

II. IMPLEMENTATIONAL EXAMPLES OF THE INVENTION

II.1—Examples not in Accordance with the Invention

The modified diene elastomers and also the rubber compositions containing them are prepared according to a process not in accordance with the invention but according to the following process described in the state of the art, in the case in point the document WO 2012007442.

Stage 1: 150 kg of diene elastomer and a targeted amount of 1,3-dipolar compound are introduced into an internal mixer, the initial vessel temperature of which is approximately 50'C. Mixing is carried out by thermomechanical kneading for 2 minutes, up to a temperature of 120° C.

Stage 2: The reinforcing filler (silica, 60 phr; carbon black N234: 3 phr), the coupling agent (Si69, 6 phr) and then, after kneading for one to two minutes, the various other ingredients (antioxidant: 3 phr; paraffin: 1 phr; stearic acid: 2.5 phr;

ZnO: 3 phr), with the exception of the vulcanization system, are introduced into the internal mixer containing the modified diene elastomer. Thermomechanical working is then carried out (non-productive phase) in one stage (total duration of the kneading equal to approximately 5 min), until a maximum "dropping" temperature of 160° C. is reached. The rubber composition thus obtained (composition NC1) is recovered.

The 1,3-dipolar compound used is a compound, the dipole of which is a nitrile oxide, in the case in point 2,4,6-trimethyl-3-(2-(2-oxoimidazolidin-1-yl)ethoxy)benzonitrile oxide. The diene elastomer is a polyisoprene, Nipol 2200 grade from Nippon Zeon.

The procedure described above is carried out again in order to manufacture four other compositions, respectively NC2 to NC5.

II.2—Examples According to the Invention

The modified diene elastomers and also the rubber compositions containing them are prepared according to the process in accordance with the invention.

Stage a): 200 kg of diene elastomer and a targeted amount of 1,3-dipolar compound are introduced into an internal mixer, the initial vessel temperature of which is approximately 50° C. Kneading is carried out for approximately 1 minute 30, until a temperature of 160° C. is obtained. The modified diene elastomer is dropped.

Stage b): The modified diene elastomer is introduced into an extruder, the set temperature of which is 30° C., equipped at its outlet with a die and with a granulator: granules are recovered.

Stage c): Approximately 150 kg of granules are introduced into an internal mixer which is 70% filled and the initial vessel temperature of which is approximately 50° C., and the reinforcing filler (silica, 60 phr; carbon black N234: 3 phr), the coupling agent (Si69, 6 phr) and then, after kneading for one to two minutes, the various other ingredients (antioxidant: 3 phr; paraffin: 1 phr; stearic acid: 2.5 phr; ZnO: 3 phr), with the exception of the vulcanization system, are introduced. Thermomechanical working is then carried out (non-productive phase) in one stage (total duration of the kneading equal to approximately 2 hours 30 min), until a maximum "dropping" temperature of 170° C. is reached.

The rubber composition thus obtained (composition C1) is recovered.

The 1,3-dipolar compound used is a compound, the dipole of which is a nitrile oxide, in the case in point 2,4,6-trimethyl-3-(2-(2-oxoimidazolidin-1-yl)ethoxy)benzonitrile oxide. The diene elastomer is a polyisoprene treated with antioxidant, Nipol 2200 grade from Nippon Zeon.

The procedure described above is carried out again in order to manufacture two other compositions, respectively C2 and C3.

II.3—Results

A targeted content, a true content of 1,3-dipolar compound, a grafted content, a grafting yield and an effectiveness of the process are defined.

The targeted content is the amount of 1,3-dipolar compound, expressed in moles per 100 mol of isoprene unit, which has been weighed and introduced into the internal mixer in stage 1 for NC1 to NC5 or in stage a) for C1 to C3; the true content is the amount, determined by nuclear magnetic resonance (NMR) analysis, of 1,3-dipolar compound in the form grafted and not grafted to the diene elastomer on conclusion of stage 2 for NC1 to NC5 or on conclusion of stage b) for C1 to C3;

the grafted content corresponds to the amount, determined by NMR analysis, of 1,3-dipolar compound in the form grafted to the diene elastomer on conclusion of stage 2 for NC1 to NC5 or on conclusion of stage b) for C1 to C3;

the grafting yield is the ratio of the amount of 1,3-dipolar compound grafted to the diene elastomer to the true content;

the effectiveness of the process is the ratio of the amount of 1,3-dipolar compound grafted to the diene elastomer to the targeted content.

These quantities are determined by NMR analysis on the modified diene elastomers or on the compositions NC1 to NC5 and C1 to C3 according to the method described below.

Method of Analysis by NMR:

The 1D $^1$H NMR experiments use a simple pulse sequence with a tilt angle of 30°, the number of repetitions is 128 scans with a recycle delay of 5 seconds.

The two-dimensional $^1$H/$^{13}$C NMR experiments are sequences of HSQC (Heteronuclear Single Quantum Coherence) and HMBC (Heteronuclear Multiple-Bond Correlation) type for short-range ($^1$J) and long-range ($^3$J)$^1$H/$^{13}$C correlations respectively. The experiments are carried out at 25° C.

Two parts of the same sample are analysed:
  the one crude (resulting directly from the end of the synthesis)
  and the other coagulated (devoid of any free molecule, in particular of ungrafted 1,3-dipolar compound).

The chemical shifts are calibrated with respect to the protonated impurity of the CDCl$_3$ δ ($^1$H)=7.20 ppm, referenced with regard to TMS (δ ($^1$H)=0.06 ppm).

Scheme 1 illustrates the portions of the isoprene units modified by the grafting of the 1,3-dipolar compound, R representing the remainder of the polyisoprene chain.

The characteristic chemical shifts of the protons of the 1,3-dipolar compound grafted to the polyisoprene (IR) chain appear in Table 1.

The quantifications were carried out from the integration of the 1D $^1$H NMR spectra using the data acquisition software.

The broad unresolved peaks under consideration for the quantification are:
  1 proton of 1,2-IR between 5.8 ppm and 5.6 ppm,
  1 proton of 1,4-IR between 5.4 and 4.7 ppm,
  2 protons of 3,4-IR between 4.7 and 4.5 ppm,
  8 protons of the 1,3-dipolar compound (4 CH$_2$) between 3.9 and 3.3 ppm.

Using the integration of the 1D $^1$H NMR spectrum of the crude part of the sample: the quantification of the total 1,3-dipolar compound unit in the grafted and ungrafted form can be carried out as % units as follows:

% total unit=integral $^1$H total unit×100/(integral $^1$H 1,4-IR unit+integral $^1$H 3,4-IR unit+integral $^1$H 1,2-IR unit).

Using the integration of the 1D $^1$H NMR spectrum of the coagulated part of the sample: the quantification of the grafted 1,3-dipolar compound unit can be carried out as % units as follows:

% grafted unit=integral $^1$H grafted unit×100/(integral $^1$H 1,4-IR unit+integral $^1$H 3,4-IR unit+integral $^1$H 1,2-IR unit).

When the analyses are carried out on the compositions, an Avancep III HD 500 MHz Bruker spectrometer equipped with a Bruker HR-MAS BBFO 1H-X 5 mm probe is used. The spectra are acquired at rotational speeds of 4000 to 5000

Hz. In this case, the sample is prepared in rotors filled with the composition and a deuterated solvent which makes possible the swelling, generally deuterated chloroform (CDCl$_3$). The amounts of sample used are adjusted so as to obtain spectra with a sufficient sensitivity and a sufficient resolution.

When the analyses are carried out on the elastomers (on conclusion of stage 1 or stage b), an Avance III HD 500 MHz Bruker spectrometer equipped with a Bruker "broad band" cryo-BBFO z-grad 5 mm probe is used. In this case, 25 mg of sample are dissolved in 1 ml of deuterated chloroform (CDCl$_3$) for the field/frequency locking.

The results appear in Table 2.

For the examples not in accordance with the invention, the true content is far below the targeted content, which clearly reflects a loss of 1,3-dipolar compound in the process. Furthermore, the grafting yields vary to a large extent since they range from 52% to 82%, which demonstrates a lack of reproducibility of the process. It may also be noted that the effectiveness of the process is low (at most 40%) if the grafting yield is calculated not on the basis of the true content of 1,3-dipolar compound but on the basis of the targeted content.

For the examples in accordance with the invention, the true content is virtually identical to the targeted content and the grafting yield is very high (of the order of 90%) and fluctuates very little in comparison with the process not in accordance with the invention.

It follows that, for the modification of large amounts of diene elastomer by a 1,3-dipolar compound, the process in accordance with the invention is much more effective than the process of the state of the art. The modified diene elastomer granules in accordance with the invention make it possible to prepare rubber compositions with a lower cost due to the effectiveness of the process for the preparation of the modified diene elastomer in the form of granules.

The use of the granules in accordance with the invention in a rubber composition makes it possible to improve the effectiveness and the reproducibility of the process for the manufacture of rubber compositions based on diene elastomer and on 1,3-dipolar compound, due to the absence of fluctuation in the degree of grafting of the diene elastomer in the process for the modification of the elastomer. As the degree of grafting does not fluctuate, the changes in properties of the rubber compositions introduced by the modification of the elastomer are better controlled and thus more reproducible.

Scheme 1:

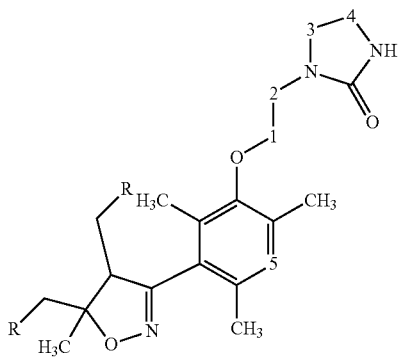

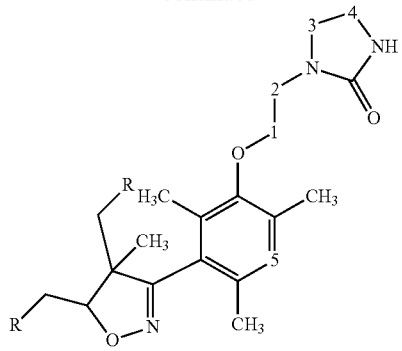

TABLE 1

| δ $^1$H (ppm) | Unit |
| --- | --- |
| 6.81 | CH No. 5 |
| 3.39 | CH$_2$ No. 4 |
| 3.65 | CH$_2$ No. 3 |
| 3.51 | CH$_2$ No. 2 |
| 3.78 | CH$_2$ No. 1 |

TABLE 2

| Composition | NC1 | NC2 | NC3 | NC4 | NC5 | C1 | C2 | C3 |
| --- | --- | --- | --- | --- | --- | --- | --- | --- |
| Targeted content (mol %) | 0.30 | 0.30 | 0.30 | 0.30 | 0.30 | 0.15 | 0.15 | 0.15 |
| True content introduced (mol %) | 0.17 | 0.14 | 0.16 | 0.15 | 0.08 | 0.15 | 0.14 | 0.15 |
| Grafting yield (%) | 59 | 82 | 52 | 67 | 75 | 92 | 93 | 87 |
| Effectiveness of the process (%) | 33 | 40 | 30 | 33 | 40 | 92 | 87 | 87 |

The invention claimed is:

1. A process for the preparation of a diene elastomer modified by a 1,3-dipolar compound, wherein the process comprises the following stages:
   a. a diene elastomer and a 1,3-dipolar compound are mixed by thermomechanical kneading in an internal mixer in order to form a diene elastomer modified by a reaction of grafting the 1,3-dipolar compound to the diene elastomer, and
   b. the modified diene elastomer is extruded before mixing the modified diene elastomer with any other constituent of a rubber composition.

2. A process according to claim 1, in which, in stage a), the diene elastomer and the 1,3-dipolar compound are kneaded until a maximum compounding temperature ranging from 110 to 180° C. is reached.

3. A process according to claim 1, in which the set temperature of the extruder does not exceed 40° C.

4. A process according to claim 1, in which the dipole of the 1,3-dipolar compound is a nitrile oxide.

5. A process according to claim 4, in which the 1,3-dipolar compound comprises a benzene ring substituted by the nitrile oxide dipole.

6. A process according to claim 5, in which the benzene ring is substituted in the position ortho to the dipole.

7. A process according to claim 1, in which the 1,3-dipolar compound contains a group containing a 5-membered dinitrogenous and carbonylated heterocycle.

8. A process according to claim 1, in which the diene elastomer is selected from the group consisting of polybutadienes, polyisoprenes, butadiene copolymers, isoprene copolymers and their mixtures.

9. A process according to claim 1, in which the diene elastomer is a polyisoprene comprising more than 90 mol % of cis-1,4 bonding.

10. A process according to claim 1, in which the diene elastomer contains an antioxidant.

11. A process according to claim 1, in which stage b) is followed by a stage of granulation of the modified diene elastomer before mixing the modified diene elastomer with other constituents of a rubber composition.

12. A process according to claim 1, in which, in stage a), the diene elastomer and the 1,3-dipolar compound are kneaded until a maximum compounding temperature between 140 and 170° C. is reached.

13. A process according to claim 7, in which the 1,3-dipolar compound contains a 2-oxoimidazolidin-1-yl group.

14. A process according to claim 9, in which the diene elastomer is a synthetic polyisoprene.

15. A process according to claim 1, wherein after extruding the modified diene elastomer, the process includes mixing the modified diene elastomer with a reinforcing filler, a crosslinking system, and other constituents to form a final rubber composition.

16. A process according to claim 1 including extruding or calendaring the final rubber composition.

17. A process for the preparation of a rubber composition based on a diene elastomer modified by a 1,3-dipolar compound and on a reinforcing filler which comprises the following stages:
  i. a diene elastomer and a 1,3-dipolar compound are mixed by thermomechanical kneading in an internal mixer in order to form a diene elastomer modified by a reaction of grafting the 1,3-dipolar compound to the diene elastomer,
  ii. the modified diene elastomer is extruded before mixing the modified diene elastomer with any other constituent of a rubber composition,
  iii. a reinforcing filler is incorporated in the modified diene elastomer resulting from stage ii) by thermomechanical kneading in an internal mixer.

18. A process according to claim 17, in which a stage of granulation of the modified diene elastomer follows stage ii) and precedes stage iii).

19. A granule of diene elastomer modified by a reaction of grafting a 1,3-dipolar compound capable of being obtained by the process defined according to claim 11.

20. A rubber composition comprising a reinforcing filler and granules of modified diene elastomer which are defined according to claim 19.

* * * * *